(12) United States Patent
Bouchard

(10) Patent No.: US 8,054,526 B2
(45) Date of Patent: Nov. 8, 2011

(54) ELECTRO-OPTIC DISPLAYS, AND COLOR FILTERS FOR USE THEREIN

(75) Inventor: Alain Bouchard, Boston, MA (US)

(73) Assignee: E Ink Corporation, Cambridge, MA (US)

( * ) Notice: Subject to any disclaimer, the term of this patent is extended or adjusted under 35 U.S.C. 154(b) by 82 days.

(21) Appl. No.: 12/408,911

(22) Filed: Mar. 23, 2009

(65) Prior Publication Data

US 2009/0237776 A1 Sep. 24, 2009

Related U.S. Application Data

(60) Provisional application No. 61/038,523, filed on Mar. 21, 2008.

(51) Int. Cl.
*G02F 1/07* (2006.01)
*G02B 26/00* (2006.01)

(52) U.S. Cl. ........................ 359/245; 359/296

(58) Field of Classification Search .................. 359/245, 359/247, 263, 296
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |

(Continued)

FOREIGN PATENT DOCUMENTS

EP  1 099 207 B1  3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — William C Choi

(74) *Attorney, Agent, or Firm* — David J. Cole

(57) ABSTRACT

A color filter array comprises orange, lime and purple sub-pixels, optionally with the addition of white sub-pixels. The color filter array is useful in electro-optic displays, especially reflective electro-optic displays. A method is provided for converting RGB images for use with the new color filter array.

22 Claims, 2 Drawing Sheets

U.S. PATENT DOCUMENTS

| | | |
|---|---|---|
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |

| | | |
|---|---|---|
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini et al. |
| 7,688,297 B2 | 3/2010 | Zehner et al. |
| 7,688,497 B2 | 3/2010 | Danner et al. |
| 7,701,525 B2 * | 4/2010 | Onogi et al. ............ 349/48 |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini et al. |
| 7,791,789 B2 | 9/2010 | Albert et al. |
| 7,826,129 B2 | 11/2010 | Wu et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0012980 A1 | 1/2005 | Wilcox et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0200874 A1 | 8/2007 | Amundson et al. |
| 2007/0211002 A1 | 9/2007 | Zehner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2007/0286975 A1 | 12/2007 | Fazel et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0030832 A1 | 2/2008 | Paolini, Jr. et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0117495 A1 | 5/2008 | Arango et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0137176 A1 | 6/2008 | Isobe et al. |
| 2008/0150888 A1 | 6/2008 | Albert et al. |
| 2008/0165122 A1 | 7/2008 | Duthaler et al. |
| 2008/0174853 A1 | 7/2008 | Danner et al. |
| 2008/0211764 A1 | 9/2008 | Albert et al. |
| 2008/0211765 A1 | 9/2008 | Comiskey et al. |
| 2008/0218839 A1 | 9/2008 | Paolini, Jr. et al. |
| 2008/0264791 A1 | 10/2008 | Paolini, Jr. et al. |
| 2008/0266245 A1 | 10/2008 | Wilcox et al. |
| 2008/0266646 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2008/0316582 A1 | 12/2008 | Danner et al. |
| 2009/0000729 A1 | 1/2009 | Danner et al. |
| 2009/0004442 A1 | 1/2009 | Danner |
| 2009/0009852 A1 | 1/2009 | Honeyman et al. |
| 2009/0034057 A1 | 2/2009 | LeCain et al. |
| 2009/0046082 A1 | 2/2009 | Jacobson et al. |
| 2009/0122389 A1 | 5/2009 | Whitesides et al. |
| 2009/0174651 A1 | 7/2009 | Jacobson et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA MicroencapsulatedElectrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

\* cited by examiner

ELECTRO-OPTIC DISPLAYS, AND COLOR FILTERS FOR USE THEREIN

REFERENCE TO RELATED APPLICATIONS

This application claims benefit of copending application Ser. No. 61/038,523, filed Mar. 21, 2008.

This application is related to:

(a) application Ser. No. 10/817,464, filed Apr. 2, 2004 (Publication No. 2004/0190114), which is a continuation of abandoned application Ser. No. 09/349,806, filed Jul. 8, 1999 and claiming benefit of application Ser. No. 60/092,050, filed Jul. 8, 1998;

(b) U.S. Pat. No. 6,864,875; and (c) U.S. Pat. No. 7,075,502.

The entire contents of these copending application and patents, and of all other U.S. patents and published and copending applications mentioned below, are herein incorporated by reference.

BACKGROUND OF INVENTION

This invention relates to electro-optic displays and color filters for use in such displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777, 782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870, 657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. No. 7,002,728 and U.S. Patent Application Publication No. 2007/0146310;

(b) Capsules, binders and encapsulation processes; see for example U.S. Pat. Nos. 6,922,276 and 7,411,719;

(c) Films and sub-assemblies containing electro-optic materials; see for example U.S. Pat. No. 6,982,178 and U.S. Patent Application Publication No. 2007/0109219;

(d) Backplanes, adhesive layers and other auxiliary layers and methods used in displays; see for example U.S. Pat. No. 7,116,318 and U.S. Patent Application Publication No. 2007/0035808;

(e) Color formation and color adjustment; see for example U.S. Pat. Nos. 6,017,584; 6,664,944; 6,864,875; 7,075,502; and 7,167,155; and U.S. Patent Applications Publication Nos. 2004/0190114; 2004/0263947; 2007/0109219; 2007/0223079; 2008/0023332; 2008/0043318; and 2008/0048970;

(f) Methods for driving displays; see for example U.S. Pat. No. 7,012,600 and U.S. Patent Application Publication No. 2006/0262060;

(g) Applications of displays; see for example U.S. Pat. No. 7,312,784 and U.S. Patent Application Publication No. 2006/0279527; and (h) Non-electrophoretic displays, as described in U.S. Pat. Nos. 6,241,921; 6,950,220; and 7,420,549.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Pat. No. 7,339,715); and other similar techniques.) Thus, the resulting display can be flexible. Further, because the display medium can be printed (using a variety of methods), the display itself can be made inexpensively.

Other types of electro-optic media may also be useful in the present invention.

Many types of electro-optic media are essentially monochrome, in the sense that any given medium has two extreme optical states and a range of gray levels lying between the two extreme optical states. As already indicated, the two extreme optical states need not be black and white. For example, one extreme optical state can be white and the other dark blue, so that the intermediate gray levels will be varying shades of blue, or one extreme optical state can be red and the other blue, so that the intermediate gray levels will be varying shades of purple.

There is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

FIG. 1 of the accompanying drawings is a schematic section through a color electrophoretic display (generally designated 100) comprising a backplane 102 bearing a plurality of pixel electrodes 104. To this backplane 102 has been laminated an inverted front plane laminate as described in the aforementioned 2007/0109219, this inverted front plane laminate comprising a monochrome electrophoretic medium layer 106 having black and white extreme optical states, an adhesive layer 108, a color filter array 110 having red, green and blue areas aligned with the pixel electrodes 104, a substantially transparent conductive layer 112 (typically formed from indium-tin-oxide, ITO) and a front protective layer 114.

In the display 100, the electrophoretic layer 106 is of course not 100 percent reflective, and the saturation of the color filter elements in the array 110 must be reduced to allow enough light to pass through the array 110, reflect from the electrophoretic layer 106, and return through the array 110. However, using a color filter array does enable a single black/white electro-optic medium to provide a full color display, and it is typically easier to control the color gamut of a display by varying the colors in a color filter array than by varying the colors of electro-optic media, there being far more materials available for use in color filter arrays than in most electro-optic media.

The color filter array shown in FIG. 1 is an RGB color filter. It is known that improved contrast can be obtained from a filter if a white pixel is included, thus producing an RGBW filter. However, it has been found that when an RGBW filter is used with an electro-optic display and the red, green and blue pixels use reasonably saturated red, green and blue colors, the white state of the display is rather poor. It has been suggested that a CMY (cyan/magenta/yellow) filter, similar to the CMY printing systems used in the color printing industry, be used in place of the RGB filter. In color printing, the cyan, magenta and yellow inks can overlap, so the resultant print can provide well saturated colors using a subtractive color mode. No such overlap is possible in a color filter used with an electro-optic display, because the cyan, magenta and yellow pixels lie alongside each other and do not overlap. It has been found that using a CMYW (cyan/magenta/yellow/white) color filter in place of an RGBW color filter improves the white state of the display but causes red, green and blue colors to look desaturated, i.e., "washed out".

Accordingly, there is a need for improved color filter arrays in electro-optic displays, and this invention seeks to provide such improved color filter arrays, and displays containing such color filters. This invention also seeks to provide a method for mapping RGB color images for use with the color filter arrays of the present invention.

SUMMARY OF THE INVENTION

It has now been found that the appearance of color images on electro-optic displays can be improved by using a new set of primary colors, this new set of primary colors being formed by mixing RGB and YCM primary colors in that precise order. The result of using the new set of primary colors is a compromise between the aforementioned properties of RGB and CMY primaries; more specifically, the new set of primaries produces red, green and blue color saturation greater than that achieved by CMY primaries, while producing a white state better than that achieved with RGB primaries, and the resulting properties render color images more attractive to the human eye than those achieved with either RGB or CMY primaries. The use of a white pixel is still highly desirable to maintain adequate contrast.

Accordingly, in one aspect this invention provides a color filter array comprising a plurality of pixels, each of the pixels comprising:
an orange sub-pixel having a hue within the range of 25 to 65° in the a*b* plane of the La*b* color space;
a lime sub-pixel having a hue within the range of 145 to 185° in said a*b* plane; and
a purple sub-pixel having a hue within the range of 265 to 305° in said a*b* plane.

In a preferred form of such a color filter, each orange sub-pixel has a hue within the range of 35 to 55° (most desirably 40 to 50°) in the a*b* plane;, each lime sub-pixel has a hue within the range of 155 to 175° (most desirably 160 to 170°) in the a*b* plane; and each purple sub-pixel has a hue within the range of 275 to 295° (most desirably 280 to 290°) in the a*b* plane. Each pixel may further comprise a white sub-pixel. Obviously, the color gamut of the color filter is affected by the chrominance of the orange, lime and purple and it is desirable that, for each of the orange, line and purple sub-pixels, the a* and b* coordinates satisfy the relationship:

$(a^*)^2+(b^*)^2 \geqq 25$ and preferably:

$(a^*)^2+(b^*)^2 \geqq 100$.

For reasons explained below, it is desirable that the angles between the orange, lime and purple sub-pixels in the a*b* plane all fall within the range of 120±5°.

This invention extends to an electro-optic display provided with a color filter of the present invention. This invention is particularly, though not exclusively intended for use in such displays having an electro-optic medium which is reflective, such that light passes through the color filter, is reflected from the electro-optic medium, and passes back through the color filter to an observer. The electro-optic display may make use of any of the types of electro-optic medium discussed above. Thus, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined with a plurality of capsules or microcells. Alternatively, the electrically charged particles and the fluid may be present as a plurality of discrete droplets surrounded by a continuous phase comprising a polymeric material. The fluid may be liquid or gaseous.

This invention extends to an electronic book reader, portable computer, tablet computer, cellular telephone, smart card, sign, watch, shelf label or flash drive comprising a display of the present invention.

Obviously, it is necessary to be able to convert RGB image data for use with the color filters of the present invention. The method set out in the following paragraph is designed for use with color filters of the present invention which have white sub-pixels and can readily be modified by those skilled in the art for use with color filters lacking such white sub-pixels.

Accordingly, this invention provides a method of converting an RGB image for display on a display according to claim 12, the method comprising, for each pixel:
(a) estimating the cyan, magenta and yellow values corresponding to the RGB values;
(b) determining the lowest of the cyan, magenta and yellow values estimated in step (a), and subtracting this lowest value from each of the cyan, magenta and yellow values estimated in step (a) to provide modified cyan, magenta and yellow values;
(c) determining the lowest of the red, green and blue values, and adding this lowest value to the modified cyan, magenta and yellow values calculated in step (b) to produce final cyan, magenta and yellows values C, M and Y respectively;
(d) obtaining the orange, lime and purple values using weighted averages of the red and yellow, green and cyan, and blue and magenta values respectively; and
(e) setting the white value to a weighted average of the lowest of the red, green and blue values and the lowest of the final cyan, magenta and yellows values C, M and Y.

BRIEF DESCRIPTION OF THE DRAWINGS

As already mentioned, FIG. 1 of the accompanying drawings is a schematic section through a color electrophoretic display.

DETAILED DESCRIPTION

As already mentioned, the present invention provides color filters based upon orange, lime and purple primaries; thus the color filters of the present invention will be referred to as "OLP" color filters, or "OLPW" if the color filters incorporate white sub-pixels. The present invention also provides electro-optic displays using such color filters and methods for converting RGB image data for use with such color filters.

As already indicated, the primaries used in the color filters of the present invention are produced by mixing weighted amounts of the relevant primaries from the RGB and YCM sets (in that order), so that the primaries may be defined as:
Orange—a mixture of Red and Yellow
Lime—a mixture of Green and Cyan
Grape—a mixture of Blue and Magenta.

The new primaries can be produced by blending the RGB and YCM primaries in different proportions depending upon the desired color gamut and contrast requirements. Optimization of the blending can be achieved by changing the proportions of the RGB and YCM primaries in a manner that effectively rotates the primaries to achieve the best balance in the saturation of the individual RGBCMY colors available from the color filter. For example, the new orange (O), lime (L) and purple (P) primaries used in the present invention can be generally defined by:

$$O=(\alpha_1 R+\alpha_2 Y)/(\alpha_1+\alpha_2)$$

$$L=(\alpha_3 G+\alpha_4 C)/(\alpha_3+\alpha_4)$$

$$P=(\alpha_5 B+\alpha_6 M)/(\alpha_5+\alpha_6)$$

where each of $\alpha_1$ through $\alpha_6$ is a constant, and the ratios $\alpha_1:\alpha_2$, $\alpha_3:\alpha_4$ and $\alpha_5:\alpha_6$ are chosen so that the orange sub-pixel has a hue within the range of 25 to 65°, the lime sub-pixel has a hue within the range of 145 to 185°, and the purple sub-pixel has a hue within the range of 265 to 305° in the a*b* plane (which implies that each of the ratios $\alpha_1:\alpha_2$, $\alpha_3:\alpha_4$ and $\alpha_5:\alpha_6$ falls within the range of about 1:2.3 to 2.3:1). The optimum ratios depend on the desired balance between maximum gamut and the ability to match a standard set of colors. In general, it is preferred to use an orange primary having a hue corresponding to 45° in the a*b* plane.

Figure 1:
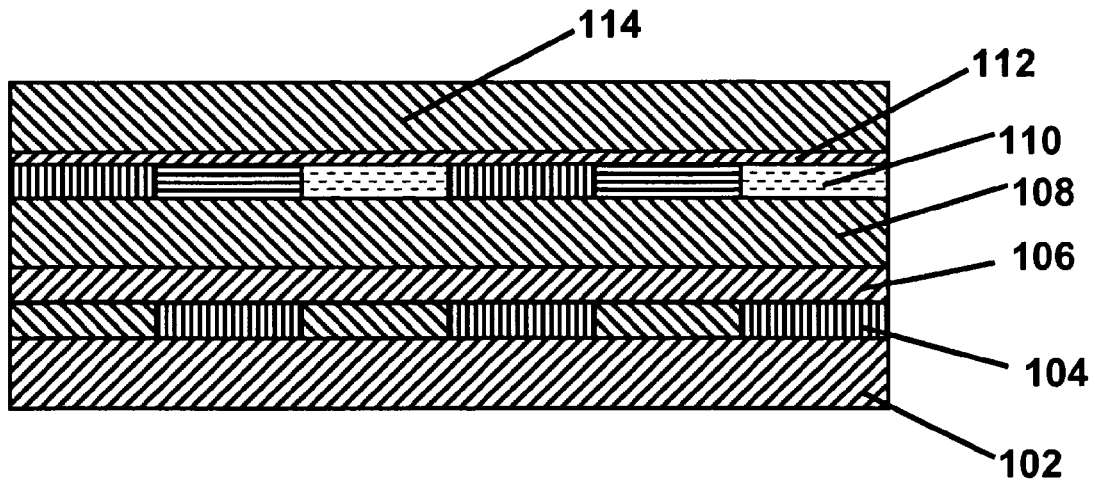
Figure 2:
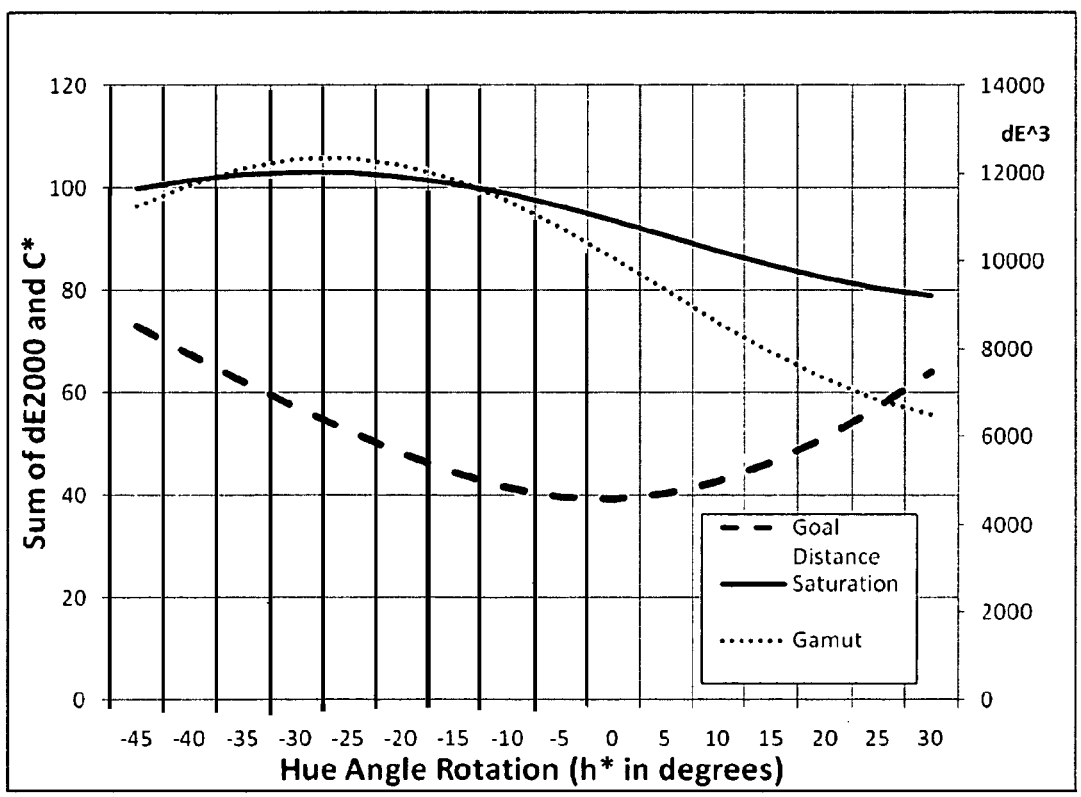
FIG. 2 is a graph showing the variation of certain properties of a display of the present invention as functions of the exact orange primary used.

FIG. 2 of the accompanying drawings is a graph showing the variation of color goal distance (i.e., the extent of inability to provide a set of standard red, green, blue, cyan, magenta and yellow colors, calculated according to the CIE DE 2000 standard—see, for example, www.brucelindbloom.com/index.html?Eqn_DeltaE_CIE2000.html), saturation and color gamut as a function of hue angle rotation for a typical color filter of the present invention, where zero hue angle rotation corresponds to an orange primary having a hue corresponding to 45° in the a*b* plane (corresponding to $\alpha_1=\alpha_2$ in the equation given above). It will be seen from FIG. 2 that although the goal distance reaches a minimum at the zero hue angle rotation (i.e., when the orange primary lies at a hue of 45° in the a*b* plane), both saturation and color gamut increase at slightly negative hue angle rotations. Accordingly, in applications where saturation and/or color gamut are considered to be of equal or greater importance than goal distance, it may be advantageous to use a hue angle rotation of about −10 to about −15°, corresponding to an orange primary having a hue corresponding to 30 to 35° in the a*b* plane, or an $\alpha_1/\alpha_2$ range of about 1.4 to 1.7. Note that positive hue angle rotations are to avoided, since it can be seen from FIG. 2 that increasing the hue angle rotation above zero results in increase in goal distance and decreases in both saturation and color gamut, all of which are undesirable.

It is typically desirable that the selected primaries fall exactly 120±5° apart in hue angle so that the "white" state of the display is essentially a neutral gray. This may be achieved by ensuring that the same $\alpha_1:\alpha_2$, $\alpha_3:\alpha_4$ and $\alpha_5:\alpha_6$ ratios are used in the calculation of each of the OLP primaries. The precise location of the primaries may be selected to obtain a desirable white point for the white state of the display. In particular, it is well known to those skilled in color science that many people prefer a slight blue hue over a strictly neutral gray in the white state of a display, but strongly dislike any hint of a red or green hue in the white state.

The OLP(W) primaries can also be desaturated slightly to improve the white state, but at some cost in color richness.

As will readily be apparent to those skilled in the image art, proper conversion of RGB images (which is the form in which most images are stored by computers) to the new primaries provided by this invention is crucial to take full advantage of the color gamut of the display. The preferred method for converting RGB images to OPLW primaries is as follows:

1. Estimate the Cyan, Magenta and Yellow values by adding their complementary primaries:

$$c'=B+G$$

$$m'=R+B \text{ and}$$

$$y'=R+G.$$

These formulas may be adjusted to improve color rendering; for example one could use different ratios of red and green for the yellow. Note that the resultant value may in some cases exceed the allowable maximum value of any color channel, typically 255.

2. Determine the lowest of the c', m' or y' values determined in Step 1 (this lowest value being denoted "min(c', m', y')"), and subtract this minimum from each of the values calculated in Step 1 to produce revised cyan, magenta and yellow values denoted c", m" and y"; thus:

$$c''=c'-\min(c', m', y')$$

$$m''=m'-\min(c', m', y')$$

$$y''=y'-\min(c', m', y').$$

3. Determine the lowest of the R, G and B values (denoted "min(RGB)"—essentially this minimum represents the gray component of the original RGB image) and add this minimum value to the modified cyan, magenta and yellow values determined in Step 2 to obtain final values cyan, magenta and yellows values C, M and Y respectively, as follows:

$$C=c''+\min(RGB)$$

$$M=m''+\min(RGB)$$

$$Y=y''+\min(RGB).$$

4. Obtain the Purple, Lime and Orange colors, using e the average of the RGB and YCM primaries, as set out above:

$$P=(B+M)/2$$

$$L=(G+C)/2$$

$$O=(R+Y)/2.$$

(Obviously, if modified OPLW primaries, with $\alpha_1:\alpha_2$, $\alpha_3:\alpha_4$ and $\alpha_5:\alpha_6$ other than 1, are to be used, the appropriate formulae for such modified primaries should be used in this Step.)

5. The White pixel value can be approximated by:

$$W=(\min(RGB)+\min(CMY))/2$$

$$W=\min(OLP).$$

The use of OPLW or modified OPLW primaries as described above allows for a balanced composition of red, green, blue, cyan, magenta, and yellow colors because each of these colors is displayed using a single pixel from the array, plus a neighbor at half the white reflectance. The effective area of the display color is thus 25+25/2=37.5 percent. Thus, the effective area is greater than one third of the area of the display, thus more than compensating for the effect of introducing a white pixel. The resulting colors produce an image which is a pleasing compromise where maximum color gamut is achieved without sacrificing contrast.

Figure 3:
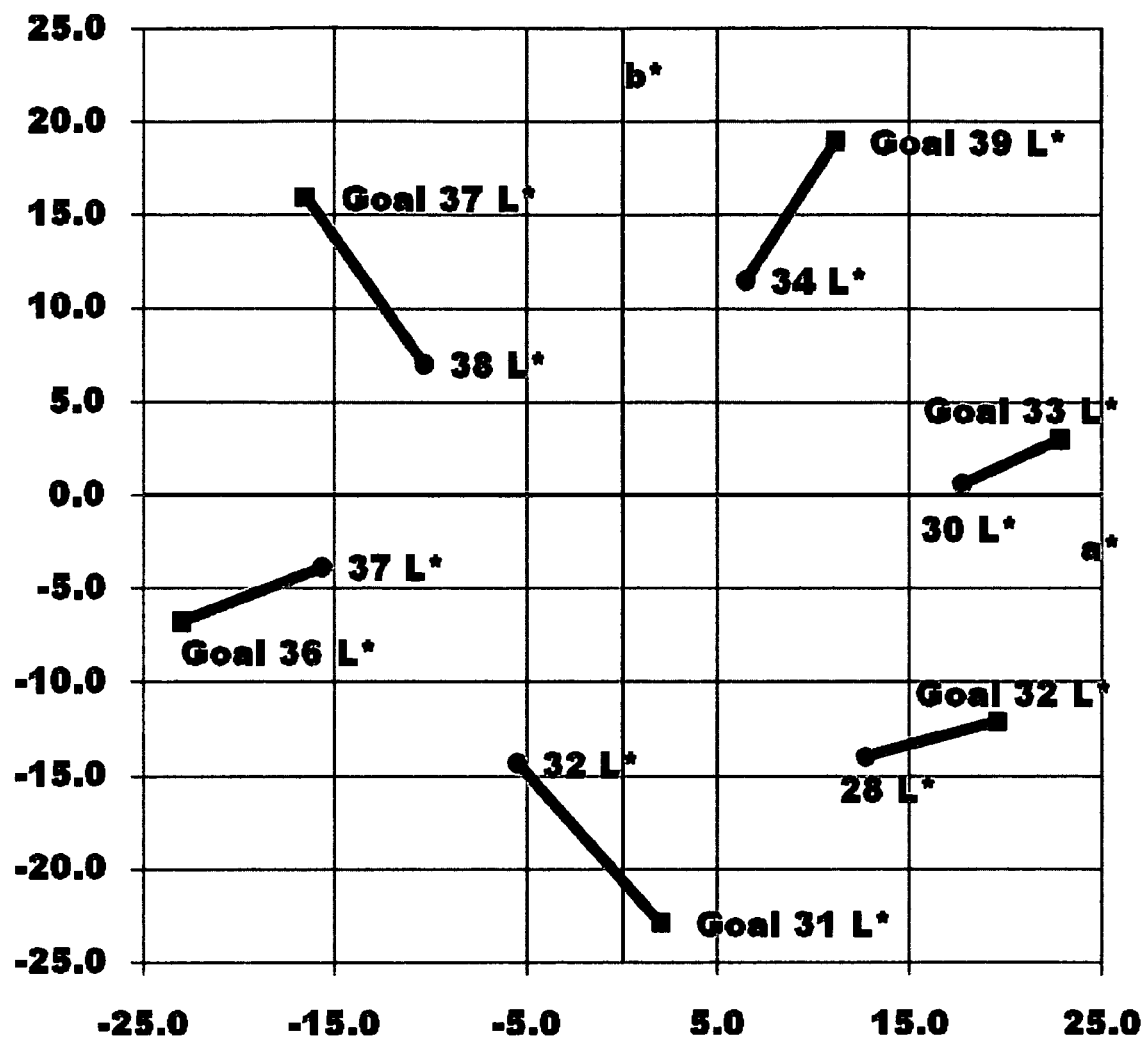
FIG. 3 is a color diagram showing in La*b* space the red, green, blue, cyan magenta and yellow colors obtainable using a color filter array of the present invention.

Furthermore, OPLW color filter arrays allow for balanced display of red, green, blue, cyan, magenta and yellow colors in a manner which conventional RGBW or CMYW color filter arrays do not. FIG. 3 shows the results obtained by modeling an OPLW color filter array of the present invention using the known spectral characteristics of set of RGB and CMY dyes, and assuming that the OPL color filter elements using equal amounts of the two relevant dyes. (Note that this is likely to be a less than optimum model; dye sets developed specifically for OPL color filter elements are likely to give better results than mixtures of dye sets originally developed for use with other primaries.) From FIG. 3 it will be seen that the color filter array of the present invention is capable of achieving colors (at the inward ends of the lines in FIG. 3) which, while less saturated that the desirable goals for display of red, green, blue, cyan, magenta and yellow colors (as indicated at the outward ends of the lines) were well balanced, and had good L* values. This balanced color display by the color filter array of the present invention is in marked contrast to conventional RGBW color filter arrays (which produce good red, green and blue colors but poor cyan, magenta and yellow colors) and to conventional CMYW color filter arrays (which produce good cyan, magenta and yellow colors but poor red, green and blue colors).

The use of OPLW or modified OPLW primaries as described above is not confined to bistable electro-optic displays; these primaries can be used in the color filters of liquid crystal displays, where they can be used to improve contrast while maintaining a large color gamut, thus reducing power requirements for front or back lights. It will typically be desirable to tune the spectrum of the front or back light when using OPLW or modified OPLW primaries.

The method described above for conversion of RGB images for display using OPLW or modified OPLW primaries is computationally simple and elegant, and yields visually pleasing images that combine the high transmittance of a CMY color filter with the high saturation of an RGB color filter. As already noted, this conversion method should be adjusted for the precise blend of color filter array primaries when modified OPLW primaries are used.

In summary, the present invention provides an improved white state of a color display with only minor impact on the saturation of basic colors, provides balanced rendering of color and better apparent saturation, and can provide energy savings when front or back lighting is used.

Numerous changes and modifications can be made in the preferred embodiments of the present invention already described without departing from the scope of the invention. Accordingly, the foregoing description is to be construed in an illustrative and not in a limitative sense.

The invention claimed is:

1. A color filter array comprising a plurality of pixels, each of the pixels comprising:
an orange sub-pixel having a hue within the range of 25 to 65° in the a*b* plane of the La*b* color space;
a lime sub-pixel having a hue within the range of 145 to 185° in said a*b* plane; and
a purple sub-pixel having a hue within the range of 265 to 305° in said a*b* plane.

2. A color filter array according to claim 1 wherein:
each orange sub-pixel has a hue within the range of 35 to 55° in said a*b* plane;
each lime sub-pixel has a hue within the range of 155 to 175° in said a*b* plane; and
each purple sub-pixel has a hue within the range of 275 to 295° in said a*b* plane.

3. A color filter array according to claim 2 wherein:
each orange sub-pixel has a hue within the range of 40 to 50° in said a*b* plane;
each lime sub-pixel has a hue within the range of 160 to 170° in said a*b* plane; and
each purple sub-pixel has a hue within the range of 280 to 290° in said a*b* plane.

4. A color filter array according to claim 1 wherein each pixel further comprises a white sub-pixel.

5. A color filter array according to claim 1 wherein, for each of the orange, line and purple sub-pixels, the a* and b* coordinates satisfy the relationship:

$$(a^*)^2+(b^*)^2 \geq 25.$$

6. A color filter array according to claim 5 wherein, for each of the orange, line and purple sub-pixels, the a* and b* coordinates satisfy the relationship:

$$(a^*)^2+(b^*)^2 \geq 100.$$

7. A color filter array according to claim 1 wherein the angles between the orange, lime and purple sub-pixels in the a*b* plane all fall within the range of 120±5°.

8. An electro-optic display provided with a color filter according to claim 1.

9. An electro-optic display according to claim 8 having an electro-optic medium which is reflective, such that light passes through the color filter, is reflected from the electro-optic medium, and passes back through the color filter to an observer.

10. An electro-optic display according to claim 8 wherein each orange sub-pixel has a hue within the range of 35 to 55° in said a*b* plane;
each lime sub-pixel has a hue within the range of 155 to 175° in said a*b* plane; and
each purple sub-pixel has a hue within the range of 275 to 295° in said a*b* plane.

11. An electro-optic display according to claim 10 wherein:
each orange sub-pixel has a hue within the range of 40 to 50° in said a*b* plane;
each lime sub-pixel has a hue within the range of 160 to 170° in said a*b* plane; and
each purple sub-pixel has a hue within the range of 280 to 290° in said a*b* plane.

12. An electro-optic display according to claim 8 wherein each pixel further comprises a white sub-pixel.

13. A method of converting an RGB image for display on a display according to claim 12, the method comprising, for each pixel:
(a) estimating the cyan, magenta and yellow values corresponding to the RGB values;
(b) determining the lowest of the cyan, magenta and yellow values estimated in step (a), and subtracting this lowest value from each of the cyan, magenta and yellow values estimated in step (a) to provide modified cyan, magenta and yellow values;

(c) determining the lowest of the red, green and blue values, and adding this lowest value to the modified cyan, magenta and yellow values calculated in step (b) to produce final cyan, magenta and yellows values C, M and Y respectively;

(d) obtaining the orange, lime and purple values using weighted averages of the red and yellow, green and cyan, and blue and magenta values respectively; and (e) setting the white value to a weighted average of the lowest of the red, green and blue values and the lowest of the final cyan, magenta and yellows values C, M and Y.

14. An electro-optic display according to claim 8 wherein, for each of the orange, line and purple sub-pixels, the a* and b* coordinates satisfy the relationship:

$$(a^*)^2 + (b^*)^2 \geq 25.$$

15. An electro-optic display according to claim 14 wherein, for each of the orange, line and purple sub-pixels, the a* and b* coordinates satisfy the relationship:

$$(a^*)^2 + (b^*)^2 \geq 100.$$

16. An electro-optic display according to claim 8 wherein the angles between the orange, lime and purple sub-pixels in the a*b* plane all fall within the range of 120±5°.

17. An electro-optic display according to claim 8 wherein the electro-optic material comprises a rotating bichromal member or electrochromic material.

18. An electro-optic display according to claim 8 wherein the electro-optic material comprises an electrophoretic material comprising a plurality of electrically charged particles disposed in a fluid and capable of moving through the fluid under the influence of an electric field.

19. An electro-optic display according to claim 18 wherein the electrically charged particles and the fluid are confined within a plurality of capsules or microcells.

20. An electro-optic display according to claim 18 wherein the electrically charged particles and the fluid are present as a plurality of discrete droplets surrounded by a continuous phase comprising a polymeric material.

21. An electro-optic display according to claim 18 wherein the fluid is gaseous.

22. An electronic book reader, portable computer, tablet computer, cellular telephone, smart card, sign, watch, shelf label or flash drive comprising a display according to claim 8.

* * * * *